Figure 3:
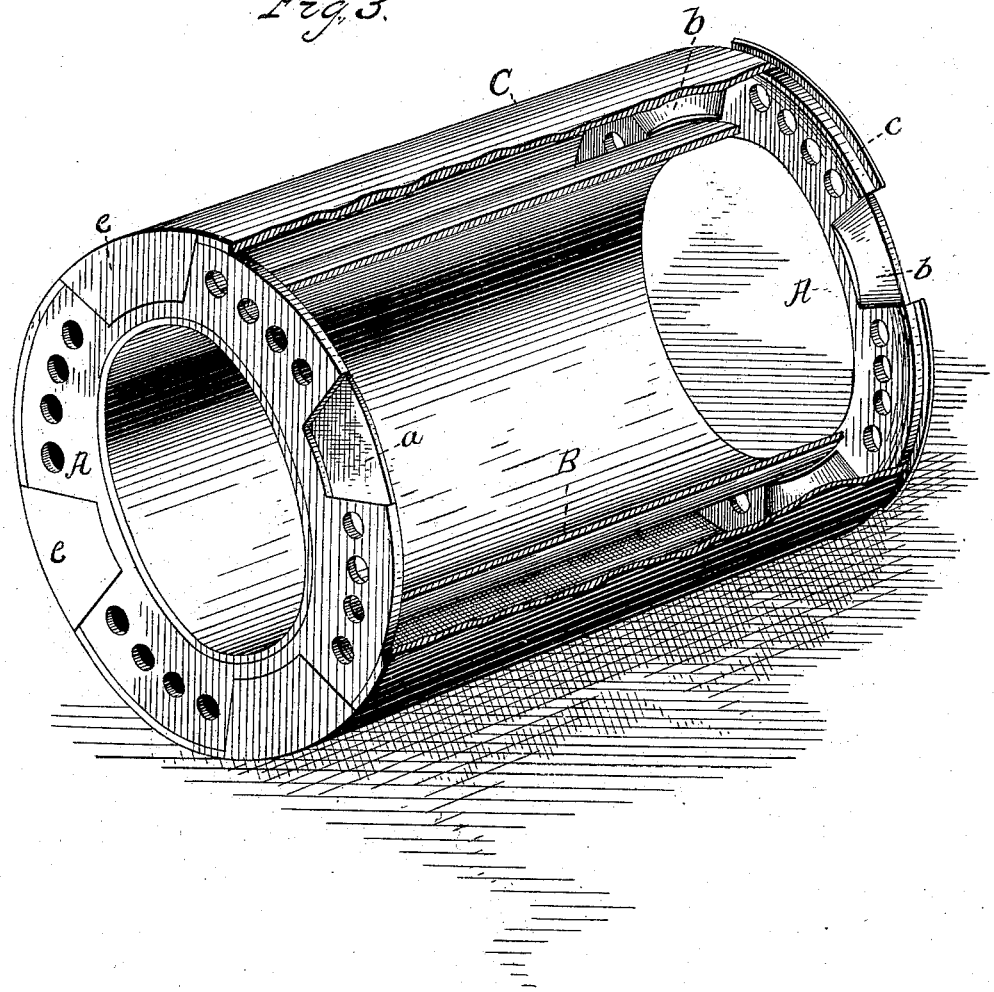

(No Model.)　　　　　　　　D. B. ROBINS.　　　　　2 Sheets—Sheet 1.
STOVE PIPE THIMBLE.
No. 312,018.　　　　　　　　　Patented Feb. 10, 1885.
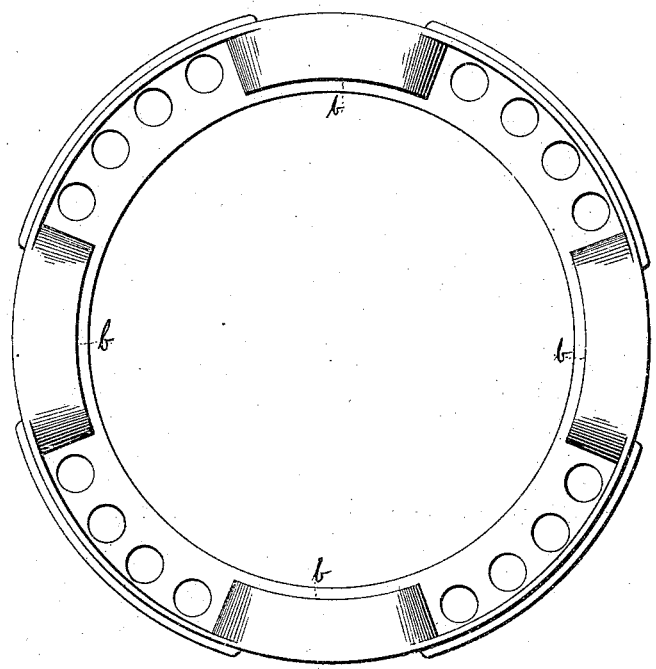
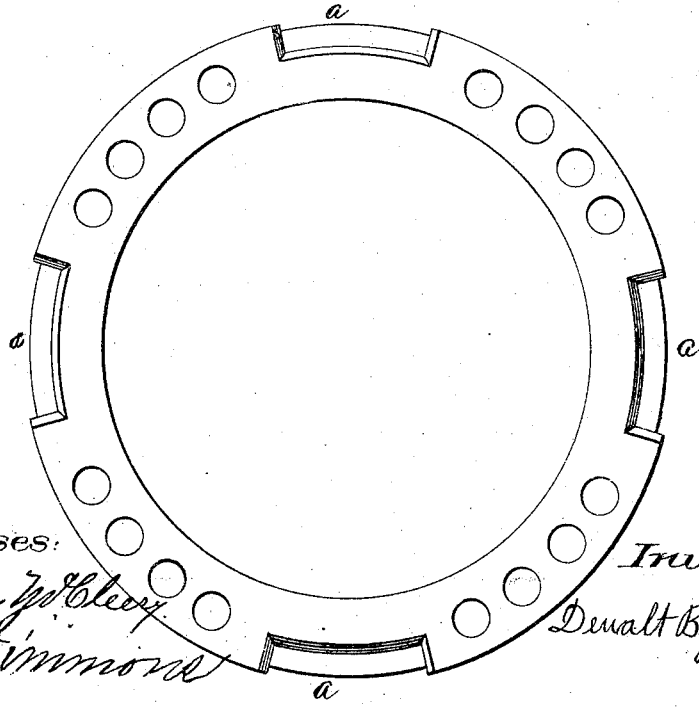
Witnesses:　　　　　　　　　　　　　　　　Inventor
William McCleery　　　　　　　　　　　Dewalt Byles Robins
H. N. Simmons (No Model.) 2 Sheets—Sheet 2.

D. B. ROBINS.
STOVE PIPE THIMBLE.

No. 312,018. Patented Feb. 10, 1885.

Witnesses
J. Frank White
E. Everett Ellis

Inventor
Dennis Byles Robins
By O. E. Duff
Atty.

UNITED STATES PATENT OFFICE.

DEWALT BYLES ROBINS, OF FREDONIA, PENNSYLVANIA.

STOVE-PIPE THIMBLE.

SPECIFICATION forming part of Letters Patent No. 312,018, dated February 10, 1885.

Application filed March 24, 1884. (No model.)

*To all whom it may concern:*

Be it known that I, DEWALT BYLES ROBINS, a citizen of the United States, residing at Fredonia, in the county of Mercer, and in the State of Pennsylvania, have invented a new and Improved Stove-Pipe Thimble, of which the following is a specification.

This improvement relates to that class of inventions known as "bushings" or "thimbles" for stove-pipes, in which a current of cold air is free to circulate through and around the opening in a partition-wall or other structure through which such pipe is made to pass, whereby the contagious effect of the outgoing products of combustion is neutralized and the supporting structure protected or guarded against burning or scorching from contact with the pipe.

The prime object of the invention is to provide the rings or heads of such thimbles of a construction whereby the inner and outer cylinders comprising the air space or chamber may be securely fastened or affixed thereto in such manner as to prevent loosening or movement of the several parts, due to jar or other causes, and also to render them readily separable for cleaning, the employment of rivets or screws being entirely dispensed with.

The invention consists substantially in the parts as constructed, and in the particular combinations to be hereinafter distinctly described, and pointed out the claims.

Referring to the annexed sheet of drawings, Figure 1 represents a top or plan view of the thimble head or ring; Fig. 1ª, an edge view thereof, and Fig. 2 a view of the bottom or under side of the ring to more clearly indicate its construction. Fig. 3 represents a perspective view of stove-pipe thimble embodying the principles of my invention.

Reference being had to the several parts by letter, A represents the ring or head, which is provided with perforations through which the air passes for creating a circulation. One of these heads is arranged around the outer edge of the opening in the wall or partition provided for the passage of the pipe to each side thereof, and the two are connected through such opening by inner and outer cylinders fastened to them at or near their inner and outer edges.

The construction of my rings or heads is such that the manner of fastening or securing the cylinders thereto is rendered very simple and firm, and which is substantially as follows: At points of the ring's circumference, preferably equidistant from each other, and at the under side, are formed lugs or offsets $b$, in which recesses $a$ are formed on the opposite or upper side of the ring. These lugs extend inwardly to within a short distance of the inner rim or edge—say about an eighth or sixteenth of an inch—so as to leave a space about equal to the thickness of the inner cylinder of the thimble, and they serve also as strengtheners for the ring. The thimble is constructed or put together by first placing the inner cylinder, B, between two of the rings, with its edges resting against the main body under the projecting lugs $b$, and then the outer cylinder, C, is placed around or over the rings and its edges cut at points corresponding with the recesses $a$, and the tongues or flap $e$, formed thereby, bent over the rim or edge of the rings into said recesses, thereby forming a tight or rigid connection of the parts.

It will be obvious that the inner cylinder will be securely retained between the rings, the outer cylinder serving to hold the parts together; and it will also be obvious that the inner cylinder in abutting against the lugs $b$ is prevented from displacement. Rivets and screws are entirely dispensed with, and a simple form of construction provided, by which the several parts can be readily put together and again taken apart. In some instances I am enabled to dispense with the use of an inner cylinder, as the stove-pipe itself may be made to serve that capacity, as will be apparent; but for the purpose of safety and effectiveness I prefer to employ both inner and outer cylinders, in the manner hereinbefore explained. A flange, $c$, is formed on the rings between the recesses, against which the edge of the outer cylinder bears.

Having thus described my invention, what I claim is—

1. A wall-ring for stove-pipe thimbles formed on one side at equidistant points of its circumference with recesses or depressions, and on the opposite side with lugs or projections which form the wall of said recesses, substantially as described.

2. A wall-ring for stove-pipe thimbles formed on its outer face with recesses or depressions, and on its opposite face with lugs or projections which extend to within a short distance of the inner rim or edge of the ring, substantially as and for the purpose described.

3. In stove-pipe thimbles, the combination, with the rings having perforations and formed on their inner and outer faces, respectively, with lugs and recesses, of the inner cylinder held between the rings under said lugs, and the outer cylinder surrounding the whole and having portions of its edges bent or turned into the recesses, all substantially as described.

DEWALT BYLES ROBINS.

Attest:
RALPH MAXWELL,
W. H. H. DUMARS.